F. ROEMER.
SUCTION APPARATUS.
APPLICATION FILED FEB. 18, 1914.
1,133,184.
Patented Mar. 23, 1915.
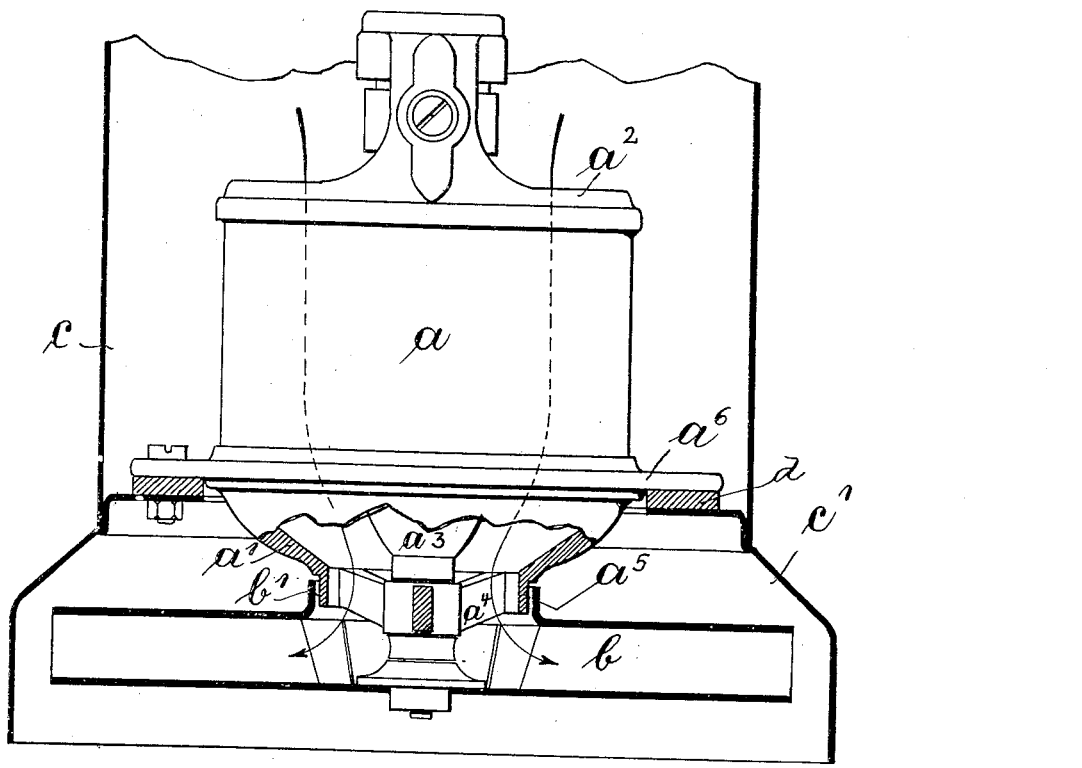

# UNITED STATES PATENT OFFICE.

FRIEDRICH ROEMER, OF FRANKFORT-ON-THE-MAIN, GERMANY.

SUCTION APPARATUS.

1,133,184.  Specification of Letters Patent.  Patented Mar. 23, 1915.

Application filed February 18, 1914. Serial No. 819,536.

*To all whom it may concern:*

Be it known that I, FRIEDRICH ROEMER, of 25 Rubenstrasse, Frankfort-on-the-Main, Germany, a subject of the German Emperor, have invented certain new and useful Improvements in Suction Apparatus, of which the following is a specification.

In electric dust-suction apparatus employing centrifugal pumps the air sucked in is conducted to the pump blade up to the present in such a manner that an intermediary wall is arranged before it, the opening of which connects up to the central suction opening of the pump blade.

In order to obtain as tight a closing as possible, the opening of the pump blade and also that of the intermediate wall are generally each provided with a cylindrical collar, both of which fit into each other concentrically with a certain amount of play.

As the above-mentioned intermediate wall is arranged directly at the casing of the apparatus, on the slightest shifting of the casing against the motor axis a mutual scraping of the above mentioned collars is caused, and in order to avoid this the play allowed between the collars in such apparatus must be relatively great which brings about a comparatively great loss through the gap. Further in such apparatus the disposition of the motor is not suitable and the current of air is not sufficiently utilized for cooling the motor.

The object of the present invention contemplates considerable practical advantages over the above described devices and is shown in diagram in the drawing. The electric motor is seen from the front of the carbon brushes and is shown partly in section at the bottom in so far as this is necessary for demonstrating the object of the invention.

$a$ is the motor, $a^1$ the open motor bottom, $a^2$ the motor lid which is also for the most part open. The motor armature $a^3$ is only partly visible and is shown resting upon a spide $a^4$ formed in the motor bottom and which includes a central motor bottom and bearing boss. $b$ is the pump blade which is provided with a cylindrical collar $b^1$ which is fitted over the cylindrical neck $a^5$ of the motor casing allowing as little play as possible. Both the neck $a^5$ and collar $b^1$ are exactly concentric with the motor axis and directly connected with it by means of the motor casing or the pump blade so that an eccentric shifting of these two parts is impossible and the gap between the cylindrical collars can be kept extremely small. As the motor is in this manner formed with an air channel the further advantage is attained that the entire quantity of air sucked in by the pump blade passes through the interior of the motor as shown by arrows on the drawing, and consequently causes an effective cooling of the motor.

In order that the motor may be placed as near as possible to the place at which the power or swinging effect of the pump blade begins, the casing thereof is provided with a rim $a^6$ which renders an air tight connection possible with the apparatus casing through the use of a suitable washer $d$ of the usual well-known elastic, felt, or equivalent types as shown.

In the form of execution shown the apparatus casing $c$ is provided with a hood $c^1$, which also forms a pump blade casing and the above mentioned connection of the motor with the apparatus casing is simplified.

From the foregoing, it is thought that the many features and advantages of the present invention will be readily understood without further description, though it will be of course understood that changes in the size, form, and proportion of the several parts may be resorted to to suit varying circumstances without departing from the spirit or the scope of the appended claims.

Having thus described my invention and illustrated its use, what I claim as new and desire to secure by Letters Patent, is the following:

1. In an apparatus of the class described, the combination with a supporting casing, of a motor casing formed with an open neck portion, an electric-motor having a shaft supported therein, and a centrifugal pump on the motor shaft comprising a casing having a telescoping connection with the said neck portion of the motor casing to maintain the said pump concentric therewith.

2. In an apparatus of the class described, the combination with a supporting casing, including a hood, of a motor casing arranged within said supporting casing and having a bottom opening, a spider arranged within said opening and including a central bearing boss, an electric-motor having a shaft journaled in said boss, and a centrifugal pump carried on the end of said shaft and communicating with the motor casing.

3. In an apparatus of the class described, the combination with a supporting casing including a hood, of a motor casing having an annular flange for engaging with the supporting casing and a depending bottom portion terminating in an open neck, a spider including a central supporting boss arranged in the open portion of the neck, an electric-motor having a shaft bearing in said boss, a centrifugal pump carried by the end of the motor shaft and arranged in said hood, and a collar formed on said pump adapted to telescope with the neck of the motor casing to maintain the pump concentric therewith.

In witness whereof I have hereunto set my hand in presence of two witnesses.

FRIEDRICH ROEMER.

Witnesses:
 JEAN GRUND,
 CARL GRUND.